US012054439B2

United States Patent
Salamone et al.

(10) Patent No.: US 12,054,439 B2
(45) Date of Patent: Aug. 6, 2024

(54) CERAMIC SUBSTRATE WITH REACTION-BONDED SILICON CARBIDE HAVING DIAMOND PARTICLES

(71) Applicant: II-VI Delaware, Inc., Wilmington, DE (US)

(72) Inventors: Samuel M. Salamone, Philadelphia, PA (US); Glen Evans, Jr., Newark, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 755 days.

(21) Appl. No.: 16/861,109

(22) Filed: Apr. 28, 2020

(65) Prior Publication Data

US 2021/0331985 A1 Oct. 28, 2021

(51) Int. Cl.
*C04B 41/87* (2006.01)
*B24B 53/017* (2012.01)
(Continued)

(52) U.S. Cl.
CPC ............ *C04B 41/87* (2013.01); *B24B 53/017* (2013.01); *B28B 11/243* (2013.01); *C04B 41/009* (2013.01); *C04B 41/4511* (2013.01); *C04B 41/4539* (2013.01); *C04B 41/455* (2013.01); *C04B 41/5059* (2013.01)

(58) Field of Classification Search
CPC ... C04B 41/87; C04B 41/009; C04B 41/4511; C04B 41/4539; C04B 41/455; C04B 41/5059; B24B 53/017; B28B 11/243
See application file for complete search history.

(56) References Cited

U.S. PATENT DOCUMENTS

| 6,551,176 B1 | 4/2003 | Garretson |
| 2007/0051354 A1* | 3/2007 | Sung ............... B24D 7/066 125/12 |

(Continued)

FOREIGN PATENT DOCUMENTS

| DE | 10 2007 063 517 | * 10/2007 |
| JP | 2006501073 A | 1/2006 |

(Continued)

OTHER PUBLICATIONS

Chemical bonding: Reaction bonded silicon carbide, Encyclopedia Brittanica, https://www.britannica.com/technology/advanced-ceramics/Chemical-bonding#ref609309 accessed Sep. 15, 2023. (Year: 2023).*

(Continued)

*Primary Examiner* — Kelly M Gambetta
(74) *Attorney, Agent, or Firm* — Blank Rome LLP

(57) ABSTRACT

A composite material can include: a substrate of a first reaction-bonded silicon carbide (first RB-SiC) material; and a reaction-bonded diamond-retaining silicon carbide (RB-DSiC) layer bonded to a surface of the substrate. In some aspects, the RB-DSiC layer includes diamond particles bonded with a second reaction-bonded silicon carbide (second RB-SiC) material. The diamond particles may be homogeneously distributed through the second RB-SiC or only at the surface thereof. The diamond particles can be in an ordered pattern or un-ordered pattern. For example, a CMP conditioning disc can include the composite material of one of the embodiments.

10 Claims, 8 Drawing Sheets

(51) Int. Cl.
B28B 11/24 (2006.01)
C04B 41/00 (2006.01)
C04B 41/45 (2006.01)
C04B 41/50 (2006.01)

(56) References Cited

U.S. PATENT DOCUMENTS

2017/0291279 A1* 10/2017 Karandikar ........... B24B 53/017
2017/0313627 A1* 11/2017 Shim ..................... C04B 35/563
2018/0099379 A1     4/2018 Mastrobattisto et al.
2021/0002534 A1*  1/2021 Matthey ................ C04B 35/528
2021/0179498 A1    6/2021 Katsikis et al.

FOREIGN PATENT DOCUMENTS

WO    2004028746 A2    4/2004
WO    2019175333 A1    9/2019

OTHER PUBLICATIONS

Salamone, et al. "Effects of Si:SiC Ratio and SiC Grain Size On Properties of RBSC" Ceramic Engineering and Science Proceedings, vol. 28, No. 2, (2007) 101-109.

Aghajanian, et al. "A New Family of Reaction Bonded Ceramics for Armor Applications" Pac Rim 4, Nov. 4-8, 2001, Paper No. PAC6-H-04-2001.

Japanese Office Action issued Jun. 29, 2022 and English translation.

* cited by examiner

CERAMIC SUBSTRATE WITH REACTION-BONDED SILICON CARBIDE HAVING DIAMOND PARTICLES

CROSS-REFERENCE TO RELATED APPLICATIONS

NA

FIELD

The embodiments discussed herein are related to a ceramic substrate that supports a reaction-bonded silicon carbide layer having diamond particles.

BACKGROUND

Unless otherwise indicated herein, the materials described herein are not prior art to the claims in the present application and are not admitted to be prior art by inclusion in this section.

Modern electronics rely on microscopic chips fabricated in single crystal silicon (Si) substrates. First, a boule of single crystal Si is grown. This boule is then diced into thin Si wafers (e.g., 300 mm diameter now, 450 mm diameter in the near future) with diamond wire saws. At this stage this Si wafers are thick and rough. The next processing step involves polishing these wafers to very high degree of flatness (e.g., rim level global flatness) and finish, as well as small thickness (e.g., <1 mm). The Si wafers are used for building the microscopic chips by depositing micro and nano-sized circuitry using processes such as lithography, metal deposition, etching, diffusion, ion implantation, etc. An exemplary application of chemical mechanical polishing (CMP) is in polishing unprocessed Si wafers to extremely high finish and flatness.

In the CMP process, mechanical rubbing and chemical reaction are both used for material removal. This is done on polishing pads (e.g., made of porous closed cell polyurethane) with slurries of different abrasive/reactive compounds (e.g., alumina, ceria, etc.). More than one silicon wafer can be polished at a time; thus, the polishing pads may be more than a meter in diameter. The polishing pad is mounted on a rigid substrate that rotates on an axis that is normal to the substrate. The abrasive media may be provided to the spinning polishing pad in the form of a slurry. The silicon wafer is mounted to a holder or "chuck", which also rotates on an axis that is parallel to axis.

As polishing continues, the cells or pores in the polishing pads fill up with abrasive and debris from the wafers, and the polishing pads develop a glaze and lose effectiveness. However, the polishing pads still have useful life because they merely need to be re-conditioned from time-to-time to open up closed cells in the polyurethane pad, improve the transport of slurry to the wafer, and provide a consistent polishing surface throughout the pad's lifetime to achieve good wafer polishing performance. To recondition the CMP pads, disks called CMP pad conditioners are used that have protruding diamonds on the surface with a recessed metal or organic matrix to retain the protruding diamonds. In these disks, typically, a single layer of coarse diamond (e.g., 125 micrometer diameter) is used, and the diamond spacing (e.g., 0.5 to 1 mm) and protrusion are carefully controlled. These diamond containing conditioning disks are fabricated to very high flatness. The key factors that provide good performance include sufficient protrusion of the diamond (e.g., good cutting ability), strong bond to matrix (e.g., prevents loss of diamond), avoiding loss of cutting ability, and preventing formation of debris that compromises conditioning.

To save time and thereby increase efficiency, the CMP pad reconditioning often is performed simultaneously with wafer polishing/planarization. One risk of this concurrent processing, however, is the risk of a diamond particle spalling or popping out of its matrix in the conditioning disc. The loose diamond material can gouge and ruin the silicon wafers being polished.

At least those CMP pad conditioning discs featuring diamond particulates bonded to metal have experienced problems in the past, such as loss of diamond particles (e.g., detachment). Without wishing to be bound to any particular theory or explanation, it could be that loss of diamond particulate results from only a mechanical bond (e.g., versus a chemical bond), chemical corrosion of the metal, or possibly due to mechanical stress resulting from thermal expansion mismatch and temperature excursions during processing. Thus, it is desirable to provide a pad conditioning disc that is less susceptible to diamond particulate loss than existing designs.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to a ceramic substrate that supports a reaction-bonded silicon carbide layer having diamond particles.

In an example embodiment, a composite material can include: a substrate of a first reaction-bonded silicon carbide (first RB-SiC) material; and reaction-bonded diamond-retaining silicon carbide (RB-DSiC) layer bonded to a surface of the substrate of the first RB-SiC material. In some aspects, the RB-DSiC layer includes diamond particles. For example, a CMP conditioning disc can include the composite material of one of the embodiments.

In another example embodiment, a method of forming a composite can include: providing a preform substrate of a first reaction-bonded silicon carbide (first RB-SiC) material; applying a silicon carbide (SiC) paste having diamond particles onto a surface of the preform substrate; infiltrating the SiC paste with molten silicon (Si) by firing the SiC paste to form a reaction-bonded diamond-retaining silicon carbide (RB-DSiC) layer bonded to the surface of the preform substrate.

In another example embodiment, a method of forming a composite can include: providing a preform substrate of a first reaction-bonded silicon carbide (first RB-SiC) material; applying a silicon carbide (SiC) paste onto a surface of the preform substrate; applying diamond particles onto or into a surface of the SiC paste; pressing the diamond particles into the surface of the SiC paste; infiltrating the SiC paste with molten silicon (Si) by firing the SiC paste to form a reaction-bonded diamond-retaining silicon carbide (RB-DSiC) layer bonded to the surface of the preform substrate.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings.

DETAILED DESCRIPTION OF SOME EXAMPLE EMBODIMENTS

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Generally, the present technology relates to a composite material that includes a reaction-bonded silicon carbide (RB-SiC) substrate (e.g., first RB-SiC material or first RB-SiC substrate) having a layer of a second reaction-bonded silicon carbide (second RB-SiC) material on the substrate. The second RB-SiC material includes diamond particles that are retained thereby, and is referenced as the reaction-bonded diamond-retaining silicon carbide (RB-DSiC) layer by having the diamond particles retained in the second RB-SiC material. The diamond particles can be mixed throughout the matrix of the second RB-SiC material whether uniformly (e.g., homogeneously) or not uniformly (e.g., non-homogeneously). The diamond particles can be distributed throughout the matrix of the second RB-SiC material or retained only at the surface of the matrix. The diamond particles can be in an ordered pattern at the surface of the matrix or in an un-ordered (e.g., random) pattern. Accordingly, the substrate can include a reaction-bonded diamond-retaining silicon carbide (RB-DSiC) layer thereon, where at least one surface of the substrate includes the RB-DSiC layer thereon.

The manufacturing protocol for preparing the RB-SiC/RB-DSiC composite can cause the surface of the substrate to react with the components of the RB-DSiC layer to form bonds therewith. The composite having the substrate and RB-DSiC layer can be a unitary member due to the bonding between the first RB-SiC material of the substrate and the second RB-SiC material of the RB-DSiC layer; however, due to being manufactured differently, the first RB-SiC material of the substrate can be distinguishable from the second RB-SiC material of the RB-DSiC layer. There may be an interface between the substrate that is distinguishable from the RB-DSiC layer, or the substrate can have at least one characteristic that is distinguishable from a characteristic of the RB-DSiC layer.

While the composite can be configured for various uses, a common device that includes the composite is a CMP conditioning disc that is used for conditioning CMP pads. As such, an CMP apparatus can include the CMP conditioning disc formed by the RB-SiC/RB-DSiC composite as described herein.

Figure 1A:
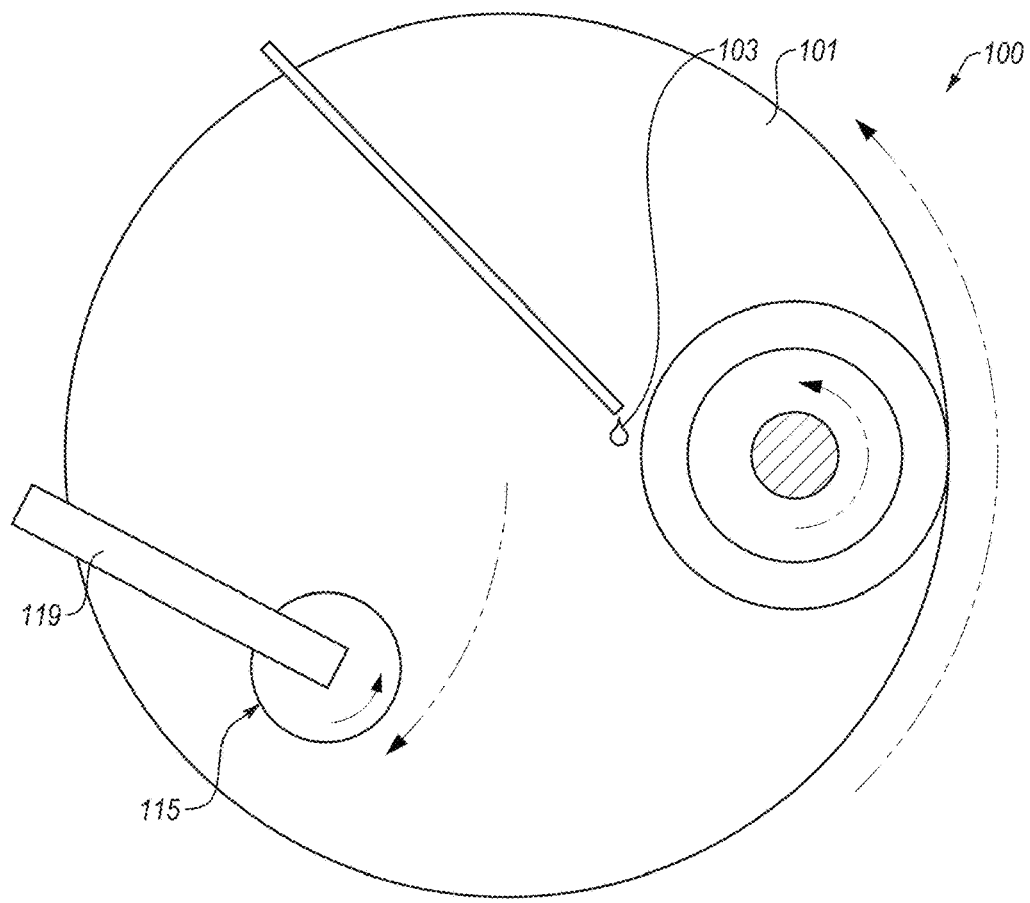
FIGS. 1A and 1B, which are top and side views, respectively, show a CMP apparatus for wafer planarization.
Figure 1B:
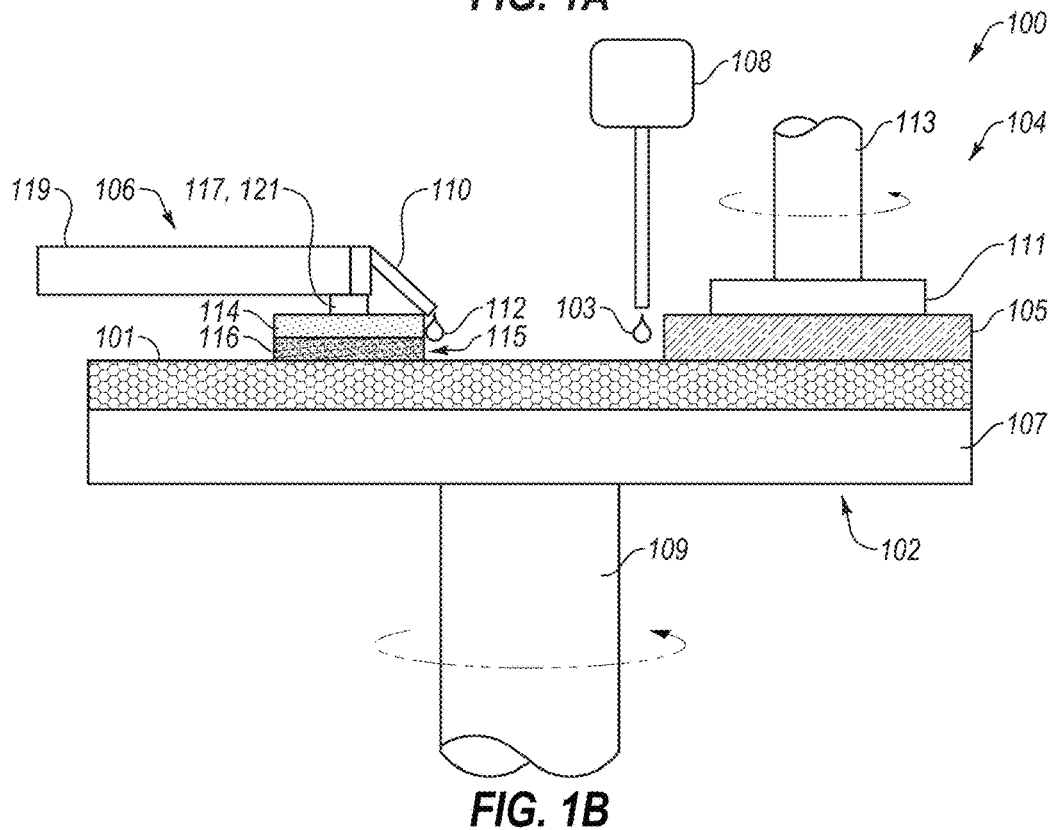

FIGS. 1A and 1B, which are top and side views, respectively, show a CMP apparatus 100 for wafer planarization. The CMP apparatus 100 has a CMP pad device 102 for providing the CMP pad 101, a wafer holder device 104 for holding the wafer 105, and a CMP Pad conditioning machine 106 having a CMP pad conditioning disc 115 for conditioning the CMP pad 101. The CMP apparatus 100 can be used in a CMP process where mechanical rubbing and chemical reaction are both used for material removal during polishing of the wafer 105 by the CMP pad 101. The CMP pad 101 can be a porous closed cell polyurethane or other material.

The CMP apparatus 100 includes a slurry application device 108 that can provide slurries 103 to the CMP pad 101. The slurries 103 can be formed from different abrasive/reactive compounds (e.g., alumina, ceria, etc.) in a liquid carrier (e.g., water).

The CMP apparatus 100 includes the wafer holder device 104 configured such that the silicon wafer 105 is mounted to a wafer holder 111 (e.g., "chuck"), which also rotates on an axis 113. More than one silicon wafer 105 can be polished at a time, and thereby the CMP apparatus 100 can include a plurality of wafer holder devices 104. Also, the polishing pads 101 may be more than a meter in diameter in some instances; however, it should be recognized that the dimension can be modulated depending on the number of wafers 105 being polished.

The CMP apparatus 100 includes the CMP pad device 102 having the CMP pad 101 configured as a polishing pad mounted on a rigid substrate 107 that rotates on an axis 109 that is normal to the substrate 107. The abrasive media in the slurry 103 may be provided to the spinning CMP pad 101 that spins on an axis 109. The axis 109 can be parallel with axis 113.

The CMP pad conditioning machine 106 has a CMP pad conditioning disc 115 held by a shaft 117 that that is mounted or attached to an arm 119. The machine 106 can move the arm 119 relative to the CMP pad 101. The machine 106 can also rotate the shaft 117 around axis 121 so that the disc 115 has a rotational axis 121 that is parallel to the rotational axis 109 of the CMP pad 101. The machine 106 then brings the disc 115 into contact with the rotating CMP pad 101 and moves the disc 115 back and forth from the periphery of the CMP pad 101 to the center or near the center, whether radially or linearly or other, or in any direction. The machine 106 may also impart rotation to the arm 119 while also rotating the conditioning disc 115. The machine 106 includes a liquid sprayer 110 that is configured for introducing a fluid 112 to the CMP pad 101 during conditioning to help in removing debris that is dislodged by the conditioning disc 115. The fluid 112 can be water or cleaning solution for cleaning off the debris removed by the conditioning disc 115. The fluid 112 can also be blown air to blow particles off of the conditioning disc 115.

The CMP pad conditioning disc 115 can include a substrate 114 (e.g., ceramic substrate, such as preform substrate) of reaction-bonded silicon carbide (e.g., first RB-SiC) and reaction-bonded diamond-retaining silicon carbide (RB-DSiC) layer 116 mounted thereon. Accordingly, the RB-DSiC layer 116 contacts the surface of the CMP pad 101. The substrate 114 provides support to the RB-DSiC layer 116, and attaches to the shaft 117.

Figure 2A:
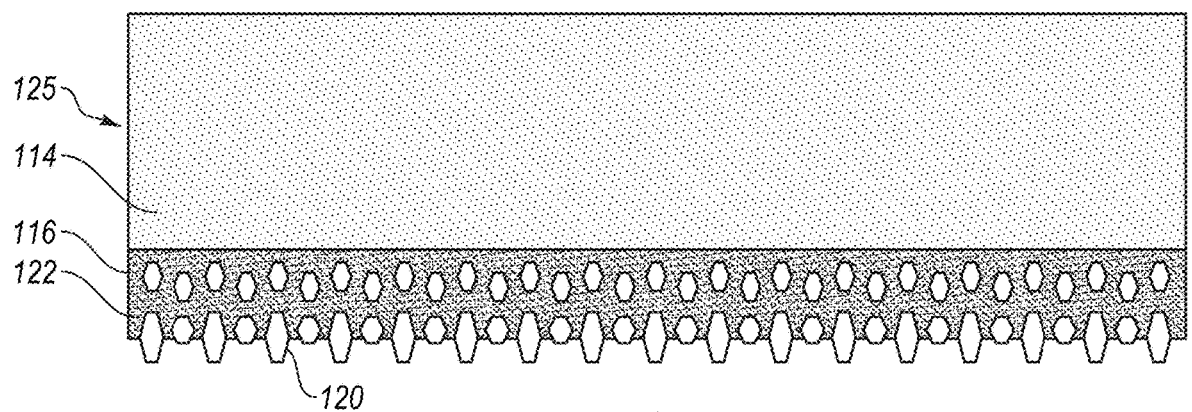
FIG. 2A shows an embodiment of a composite having a substrate supporting a reaction-bonded silicon carbide and diamond (RB-DSiC) layer mounted on the substrate.

FIG. 2A shows the CMP pad conditioning disc 125 with the substrate 114 supporting the reaction-bonded diamond-retaining silicon carbide (RB-DSiC) layer 116 mounted thereon. The RB-DSiC layer 116 can include the diamond particles 120 intermingled in a second reaction-bonded silicon carbide (second RB-SiC) matrix 122 during formation of the RB-DSiC layer 116. The diamond particles 120 can be at least one of: at the surface of the matrix 122, protruding through a surface of the matrix 122, or embedded in the matrix 122. The embedded diamonds particles 120 are completely embedded in the matrix 122 so as to be completely surrounded by matrix 122.

Figure 2B:
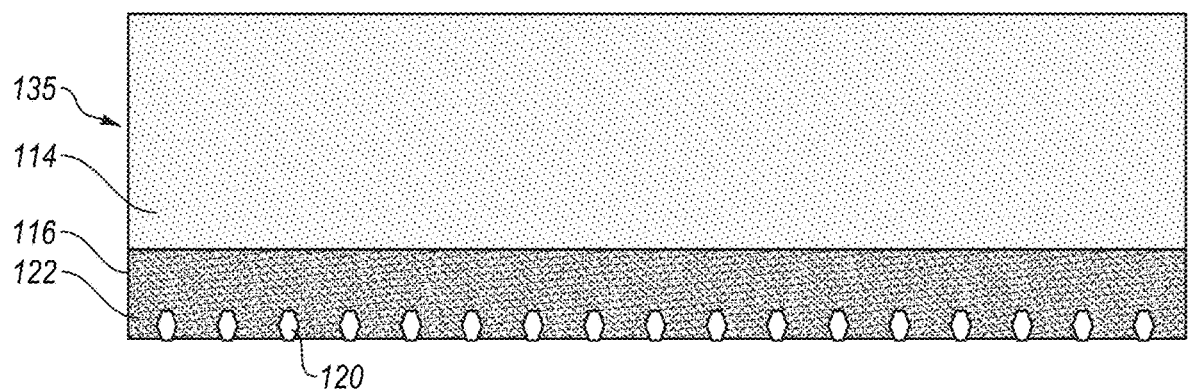
FIG. 2B shows another embodiment of a composite having a substrate supporting a RB-DSiC layer mounted thereon with diamond particles distributed at a surface of the RB-DSiC layer.

FIG. 2B shows the CMP pad conditioning disc 135 with the substrate 114 supporting the RB-DSiC layer 116 mounted thereon. The RB-DSiC layer 116 can include the diamond particles 120 at the surface of the second RB-SiC matrix 122. The diamond particles 120 can be at the surface of the matrix 122 and protruding through a surface of the matrix 122. In this embodiment, no diamond particles 120 are shown to be completely embedded in the matrix 122 so as to be completely surrounded by matrix 122.

Figure 2C:
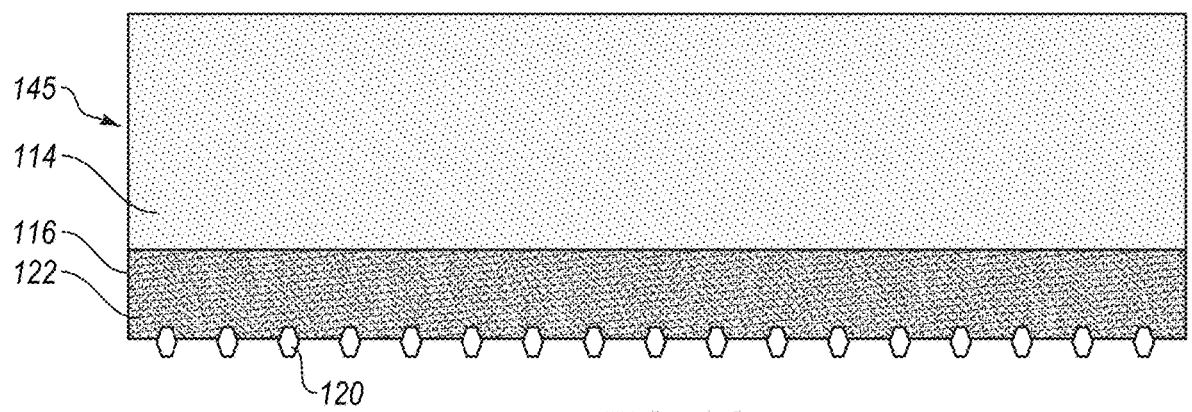
FIG. 2C shows another embodiment of a composite having a substrate supporting a RB-DSiC layer mounted thereon with diamond particles protruding from a surface of the DSiC layer.

FIG. 2C shows the CMP pad conditioning disc 145 with the substrate 114 supporting the RB-DSiC layer 116 mounted thereon. The RB-DSiC layer 116 can include the diamond particles 120 protruding from the surface of the second RB-SiC matrix 122. The diamond particles 120 can be in the surface of the matrix 122 and protruding through the matrix 122. In this embodiment, no diamond particles 120 are shown to be completely embedded in the matrix 122 so as to be completely surrounded by matrix 122. While some diamond particles 120 may be at the surface of the matrix 122 and not protruding, most diamonds protrude from the surface of the matrix 122.

FIGS. 2A-2C and other figures herein show the diamond particles 120 to be hexagon shaped, which is merely exemplary of a shape. The diamond particles 120 can be in any shape, including jagged and roughly shaped, and including shapes that are planarized having a flat surface. As such, the diamond particles 120 in the figures may be any type of diamond particle of any shape, whether processed to include flat surface or unprocessed or jagged. The configuration of the diamond particles 120 of any one of the embodiments of FIGS. 2A-2C can be combined with the other embodiments. Accordingly, the matrix 122 of FIGS. 2B and 2C can include diamond particles 120 within the matrix as well protruding from the surface of the matrix. The diamond particles embedded in the matrix 122 may be the same size or smaller than the diamond particles that protrude from the matrix 122.

The second RB-SiC matrix 122 can have the diamond particles 120 protruding through the surface at various degrees. That is, each diamond particle 120 can have a percentage of diamond height (e.g., length of particle in Z axis that is normal to the surface) below the surface of the matrix 122 and a percentage of diamond height protruding past the surface. In some aspects, each of the diamond particles 120 can have a random embedding in the matrix 122 so that there are variations in the percentage of diamond height below the surface of the matrix 122 and variations in the percentage of diamond height protruding past the surface for each diamond 120. A paste of the silicon carbide and diamond particles can be mixed and then fired to obtain the random distribution. This protocol can result in the configuration of FIG. 2A. Instead of percentages, each diamond can have a dimension of protrusion from the surface or a dimension of insertion into the matrix 122.

Figure 2D:
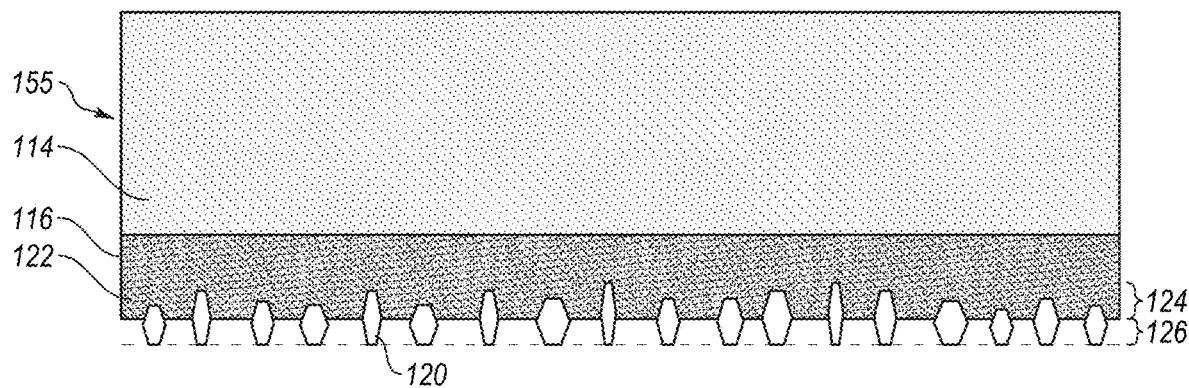
FIG. 2D shows another embodiment of a composite having a substrate supporting a RB-DSiC layer mounted thereon with diamond particles protruding from a surface of the RB-DSiC layer at about an equal height.

In some embodiments, the diamond particles 120 can have a variable length of the diamond height 124 below the surface of the matrix 122 and a substantially similar length of the diamond height 126 protruding past the surface, as shown in FIG. 2D. The dashed line shows that the diamond particles 120 all protrude about the same distance (e.g., length, dimension of protrusion) from the surface of the matrix 122. This configuration can be obtained by affixing the diamond particles 120 to an adhesive substrate and pressing the diamond particles 120 into the silicon carbide (SiC) paste before firing into the RB-DSiC layer. Alternatively, the diamond particles 120 can be spread on the surface of the SiC paste and pressed into the surface. Here, the diamond particles 120 all protrude from the surface by the same amount or distance (e.g., length, dimension of protrusion).

Figure 2E:
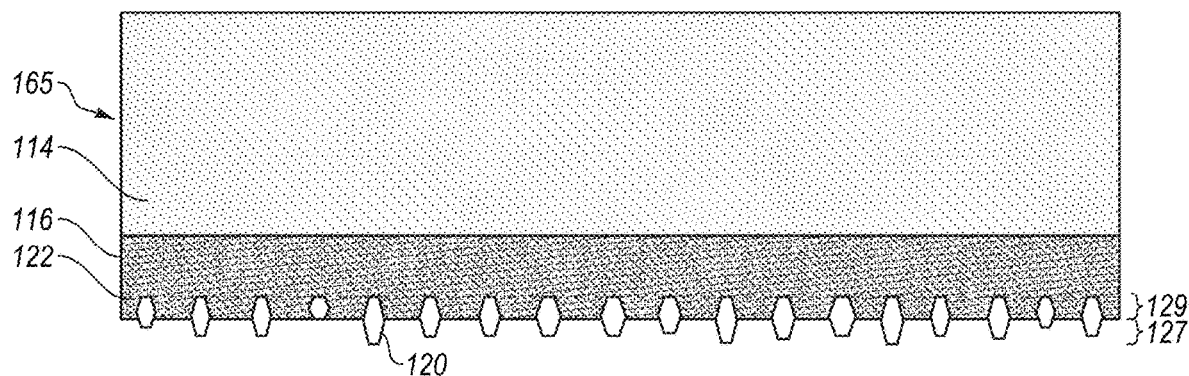
FIG. 2E shows another embodiment of a composite having a substrate supporting a RB-DSiC layer mounted thereon with diamond particles pressed into a surface of the RB-DSiC layer at about an equal depth.

In some embodiments, the diamond particles 120 can have a similar length of diamond height 129 below the surface of the matrix 122 (e.g., dimension of insertion) and a variable length of diamond height 127 protruding past the surface, as shown in FIG. 2E. The dashed line in the matrix 122 shows that the diamond particles 120 all are embedded about the same distance (e.g., length) from the surface of the matrix 122. This configuration can be obtained by pressing the diamond particles 120 partially into an ablatable substrate so that some portion of the diamond particles 120 protrudes from the surface of the ablatable substrate and filling the silicon carbide matrix 122 around the portion of diamonds exposed from the surface of the abatable substrate before firing. There is a variable dimension of diamond height below the surface of the ablatable substrate and a substantially similar dimension of diamond height protruding past the surface ablatable substrate. This results in the substantially similar amount of diamond height then being embedded in the matrix 122. Here, the diamond particles 120 area all embedded into the matrix 122 by the same amount or distance (e.g., dimension of insertion).

Figure 2F:
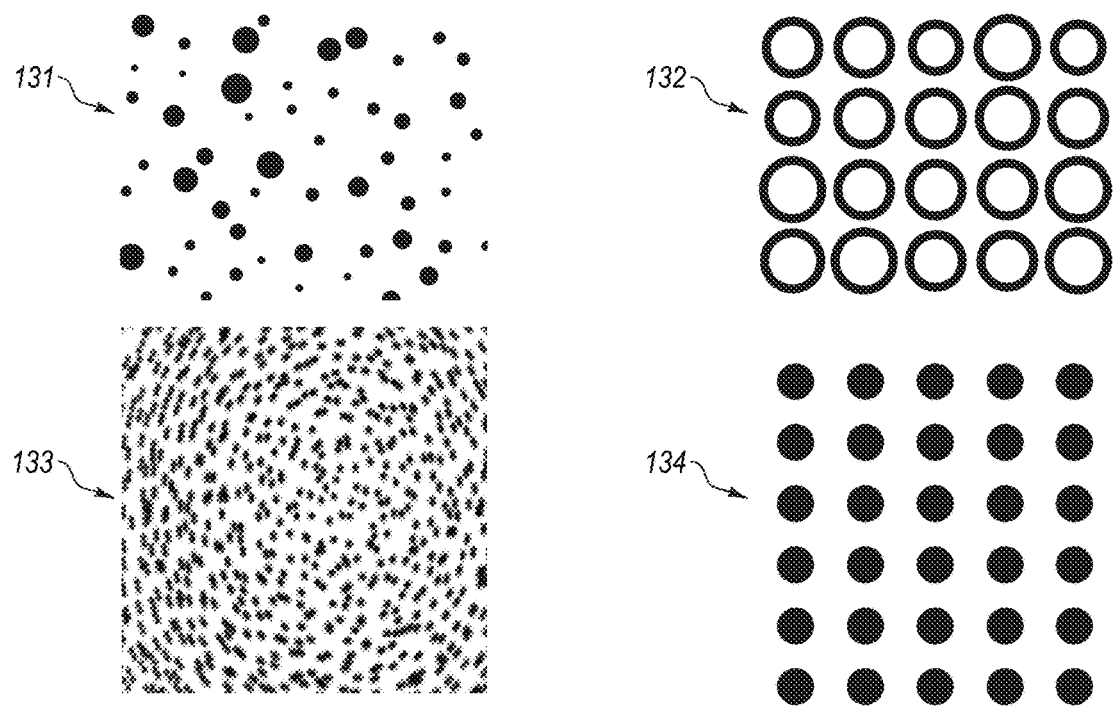
FIG. 2F shows embodiments of different diamond particle distributions on the surface of the RB-DSiC layer.

FIG. 2F shows that the diamond particles can be: random size in random pattern 131; random size in same pattern 132; same size in random pattern 133, or same size in same pattern 134; or other variations.

Figure 3:
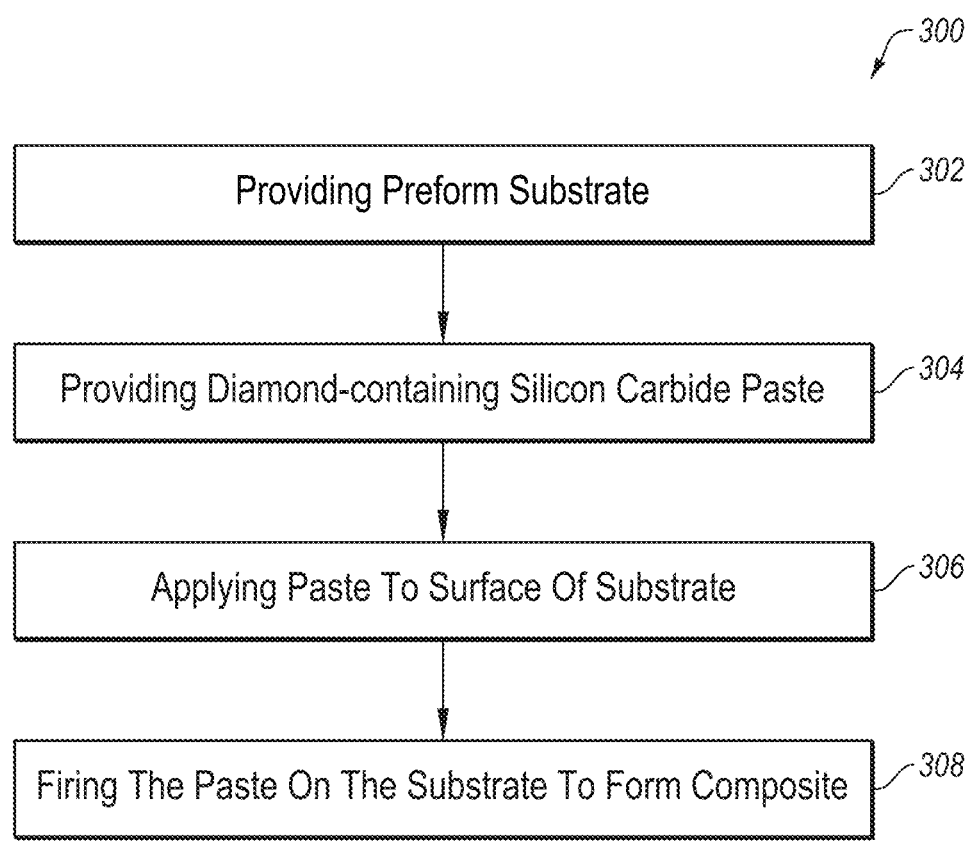
FIG. 3 shows an embodiment of a method of forming the composite of FIG. 2A.

FIG. 3 shows a method 300 of forming the composite material, which can be used as a CMP pad conditioning disc 125 as shown in FIG. 2A. The method 300 can include a step of providing a performed substrate at block 302. The preformed substrate can be a ceramic substrate, such as a silicon carbide substrate or first reaction-bonded silicon carbide (first RB-SiC) substrate. The method 300 can include a step of providing a silicon carbide paste that includes diamond particles distributed therethrough at block 304. Here, the paste can be formed by mixing the diamond particles into the silicon carbide paste, or it can be pre-made. The paste can be formed by having fine silicon carbide particles and diamond particles mixed into an organic binder. The diamond particles can be significantly larger than the silicon carbide particles. The method 300 can include applying the paste to a surface of the ceramic substrate at block 306. Then, the method 300 can include a step of firing the ceramic substrate having the paste for reactively infiltrating the diamond-retaining silicon carbide paste with molten silicon such that the molten silicon can react with the organic binder in the process of forming the composite at block 308. The block 308 of method 300 can be referred to as firing the silicon-infiltrated diamond-retaining silicon carbide paste on the substrate. The firing can result in the molten silicon reacting with the silicon carbide and diamonds to create a reaction-bonded silicon carbide having chemically bonded diamonds distributed therein to form the reaction-bonded diamond-retaining silicon carbide (RB-DSiC) layer. Additionally, the firing can result in the second reaction-bonded silicon carbide (RB-SiC) of the RB-DSiC layer bonding with the first reaction bonded silicon carbide (e.g., first RB-SiC) material of the ceramic substrate. This forms an integral member of the first RB-SiC material of the substrate bonded with the second RB-SiC material of the RB-DSiC composite material.

Figure 4A:
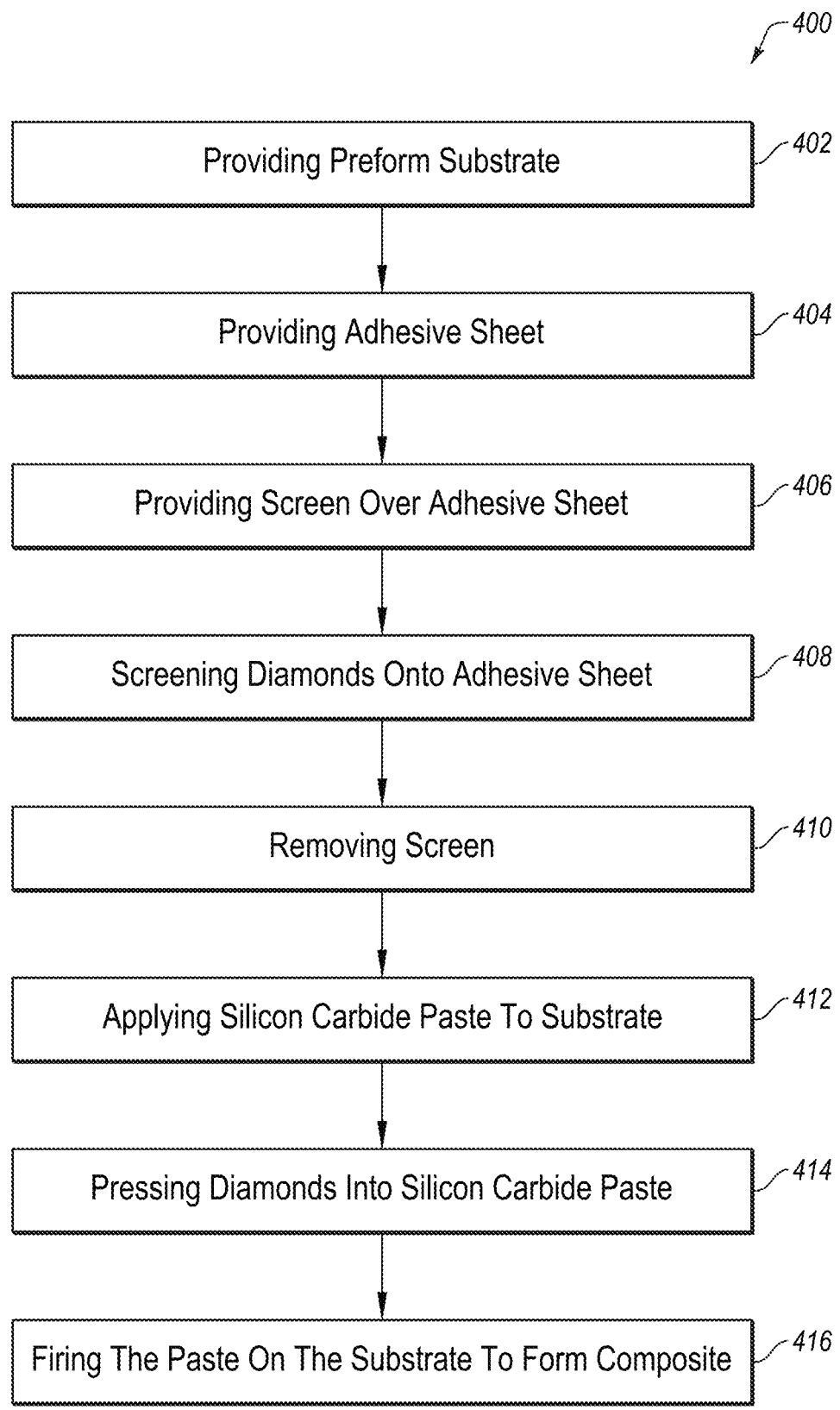
FIGS. 4A and 4B show embodiments of a method of forming the composite of one of FIGS. 2B-2E.

FIG. 4A shows a method 400 of forming the composite material, which can be used as the CMP pad conditioning disc 135 as shown in FIG. 2B or disc 145 of FIG. 2C or disc 155 of FIG. 2D with some variances in the method 400. The method 400 can include a step of providing a performed substrate at block 402. The preformed substrate can be a ceramic substrate, such as a silicon carbide substrate or first RB-SiC substrate. The method 400 can include providing an adhesive sheet at block 404. The adhesive sheet can be in any form and may be a planar material with at least one adhesive surface. The adhesive sheet can be prefabricated or prepared to include the adhesive surface. The adhesive sheet can include a substrate with an adhesive surface, or it can be a wax substrate that functions as an adhesive sheet. The adherence potential of the adhesive sheet can be modulated for sticking to diamond particles. The method 400 can include providing a screen over the adhesive sheet at block 406. The screen may be touching the adhesive sheet or it can be suspended thereover. The screen can be prefabricated or it can be formed to include the apertures that provide for scanning. The method 400 can include screening diamond particles through the screen into the adhesive sheet at block 408. The diamond particles pass through the apertures in the screen and stick to the adhesive sheet. The method 400 can include removing the screen from the adhesive sheet at block 410. The method 400 can include a step of applying a silicon carbide paste with or without diamonds distributed therethrough to the surface of the preformed substrate at block 412. While the paste may include diamond particles mixed therein in some embodiments, embodiments without the diamond particles mixed in the paste can also be favorable. Alternatively, diamond particles mixed into the paste can be fine particles and substantially smaller than the particles embedded in the surface of the paste. Here, the paste can be formed by forming the silicon carbide paste with organic binder, or it can be pre-made. The paste can be formed by having fine silicon carbide particles mixed into an organic binder, with or without fine diamond particulates therein. The diamond particles attached to the adhesive sheet can be significantly larger than the silicon carbide particles or any fine diamond particulates within the paste. The silicon carbide paste is applied to a surface of the ceramic substrate in any manner. The method 400 can include the step of pressing the diamond particles at least partially into the silicon carbide paste that is on the preformed substrate at block 414. The diamond particles can be placed on the surface of the silicon carbide paste and then pressure can be applied to the adhesive sheet to press the diamond particles into the paste. The percentage of the height of the diamond particles protruding from the surface of the paste can be controlled by the pressing. The method 400 can include a step of firing the ceramic substrate having the paste for reactively infiltrating the diamond-containing silicon carbide paste with molten silicon such that the molten silicon can react with the organic binder in the process of forming the composite and can contact the diamonds at block 416. The block 416 of method 400 can be referred to as firing the silicon-infiltrated diamond-containing silicon carbide paste. The firing can result in the molten silicon reacting with the silicon carbide, carbon from the organic binder, and diamonds to create a reaction-bonded silicon carbide having chemically bonded diamonds distributed therein to form the RB-DSiC composite material. Additionally, the firing can results in the reaction-bonded silicon carbide bonding with the silicon carbide of the ceramic substrate. This forms an integral member of the substrate bonded with the diamond silicon carbide composite material.

The method 400 can be adapted so as to provide the CMP pad conditioning disc 165 as shown in FIG. 2E. The modified method can include a step of pressing the diamond particles into the adhesive sheet, such as when the adhesive sheet is malleable and deformable, such as by being wax. Then the diamond particles can be pressed into the silicon carbide paste and the method can be performed as described.

In some embodiments, the step of screening the diamond particles and removing the screen can be omitted. The diamond particles can then be deposited directly on the surface of the silicon carbide paste as they are sprinkled This allows for random distributions of diamond particles on the surface of the silicon carbide paste. However, a screen with a random aperture distribution could also be used, but most screens can be fabricated to have defined structured patterns, such as in rows, columns, even arrays, staggered arrays, aligned arrays, repeating shapes, or others. Thus, defined ordered patterns or random distributions of diamonds can be formed on the silicon carbide paste.

Figure 4B:
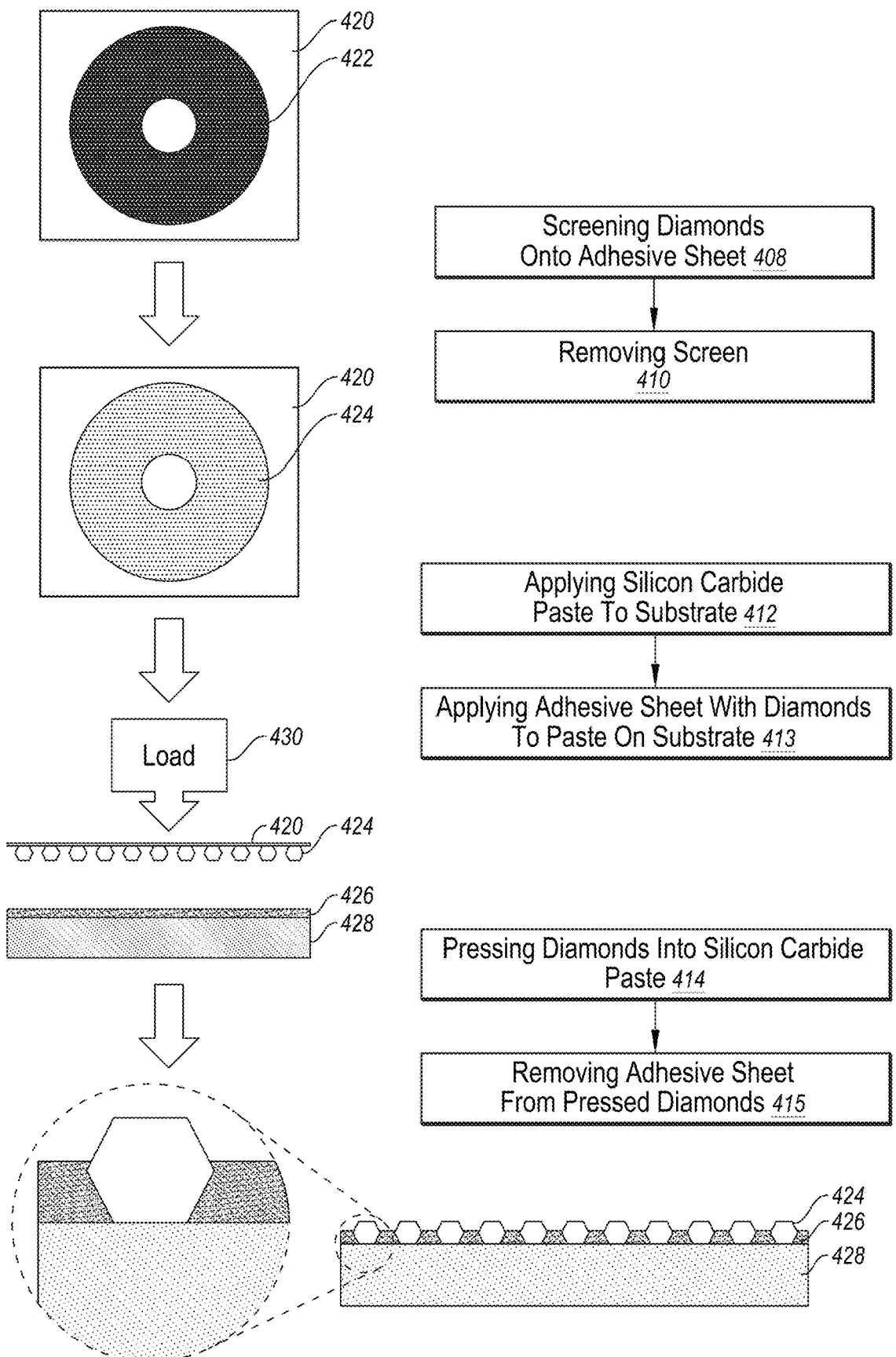

FIG. 4B shows schematic of the method 400 of FIG. 4. As shown, an adhesive sheet 420 is associated with a screen 422. Here, while the adhesive sheet 420 is shaped in a square, and the screen 422 is an annular disc, the shapes may change depending on the shape of the product and the intended use. It should be noted that a composite in the form of an annular disc can be the shape of the CMP conditioning disc. The screen 422 can be suspended over the adhesive sheet 420 so that it does not stick. As shown, the step of screening diamond particles 424 onto the adhesive sheet 420 is performed (e.g., block 408). Then, the screen 422 is removed (e.g., block 410) by removing the screen from above the adhesive sheet 420. This results in the adhesive sheet 420 including diamond particles 424 adhered thereto.

The method 400 includes applying the silicon carbide paste 426 to the substrate 428 (e.g., block 412), and then applying the adhesive sheet 420 with the diamond particles 424 to the silicon carbide paste 426 that is on the substrate at block 413, which step can be included in method 400 of FIG. 4A. A load 430 is then applied to the adhesive sheet 420 for pressing the diamond particles 424 into the silicon carbide paste 426 on the substrate 428 (e.g., block 414). The adhesive sheet 420 can then be removed by removing the adhesive sheet 420 from the diamond particles 424 once they are inserted into the silicon carbide paste 426 at block 415, which step can be included in method 400 of FIG. 4A. Then, the structure having the diamond particles 424 at least partially embedded in the silicon carbide paste 426 on the substrate 428 can be processed as described to solidify the structure.

Substrate

The figures illustrate the RB-DSiC layer to be supported by a substrate. This substrate can be a reaction-bonded silicon carbide (RB-SiC) substrate (e.g., first RB-SiC material). For CMP conditioning applications, the substrate will have a planar or substantially planar surface for receiving the silicon carbide paste. However, the substrate can be of any shape and have a surface that is flat, concave, convex, or combinations thereof as well as periods thereof (e.g., wavy surface). While CMP conditioning has been described as an example, the composite can be used in a number of applications and devices, which are described in more detail below.

The substrate can be prepared as known in the art. Accordingly, examples of the preparation protocols can be found in: U.S. Pat. Nos. 6,995,103; 7,658,781; 8,474,362; 8,741,212; and U.S. Publication No. 2017/0291279, which area all incorporated herein by specific reference in their entirety.

Generally, the methods of forming the substrate can include preparing a preform of SiC plus carbon (e.g., silicon carbide particles and carbon material mixed together) and infiltrating the mixture with molten, liquid or vapor silicon. The carbon may be carbon particles, nanotubes, or from an organic binder that includes carbon atoms. This results in the silicon reacting with the carbon to form SiC, and thereby the SiC particles bond with the carbon material and with the infiltrating silicon to form the composite material. Vapor silicon infiltration can prepare a porous SiC substrate, while liquid infiltration can form a dense Si/SiC substrate. The process can be varied to modulate the properties of the resulting substrate. For example, the size of the SiC particles can be varied, the relative amount of carbon can be varied, type of organic binder as the source of carbon can be varied, and doping materials can be added, as well as others.

In an example, preformed SiC particles are mixed with an organic resin and shaped (e.g., molded) into the desired shape. Then, the resin is pyrolyzed (e.g., fired) and converted to carbon at about 600° C. Molten Si is then infiltrated into the SiC under vacuum at about 1,600° C. The product is dense (e.g., 100% dense) and includes the SiC matrix along with remaining unreacted Si, which may be referred to as RB-SiC or Si/SiC. Substantially all of the carbon is typically used in the manufacture procedure.

In some embodiments, the SiC particles for the substrate can range in size from about 1 µm to about 300 µm, about 2 µm to about 200 µm, or about 10 µm to about 100 µm, or about 25 µm to about 50 µm, or about 75 µm as an example.

Silicon Carbide Paste

The silicon carbide (SiC) paste that is used to bind with the diamond particles can be prepared in the same manner as the composition for the substrate. However, the binder can be configured as more paste-like or provided in an amount that allows for paste-like properties. The same incorporated references provide for the general protocol for forming the SiC paste.

In some embodiments, the SiC particles in the SiC paste can range in size from about 1 µm to about 300 µm, about 2 µm to about 200 µm, or about 10 µm to about 100 µm, or about 25 µm to about 50 µm, or about 75 µm as an example, which can be dependent on diamond size.

In some embodiments, the type of organic binder (e.g., carbon source) can be selected from the group consisting of polymeric compounds, such as polyvinyl alcohol (PVA), epoxy and phenolic; or nano-carbon based slurries.

In some embodiments, the paste can include 0 to 90% by volume SiC particles and 10 to 100% by volume organic binder.

Diamond-Reinforced Silicon Carbide

As illustrated in FIG. 2A and described in connection to FIG. 3, the silicon carbide (SiC) paste described herein with the SiC particles in the organic binder can further be combined with diamond particles. The diamond particles can be provided in various shapes and sizes as well as graded to have diamond particles of certain size ranges. The diamonds can be provided in various amounts relative to the SiC particles and organic binder. Particularly, U.S. 2017/0291279 provides examples of diamond-reinforced SiC pastes and methods of making the same.

Figure 5A:
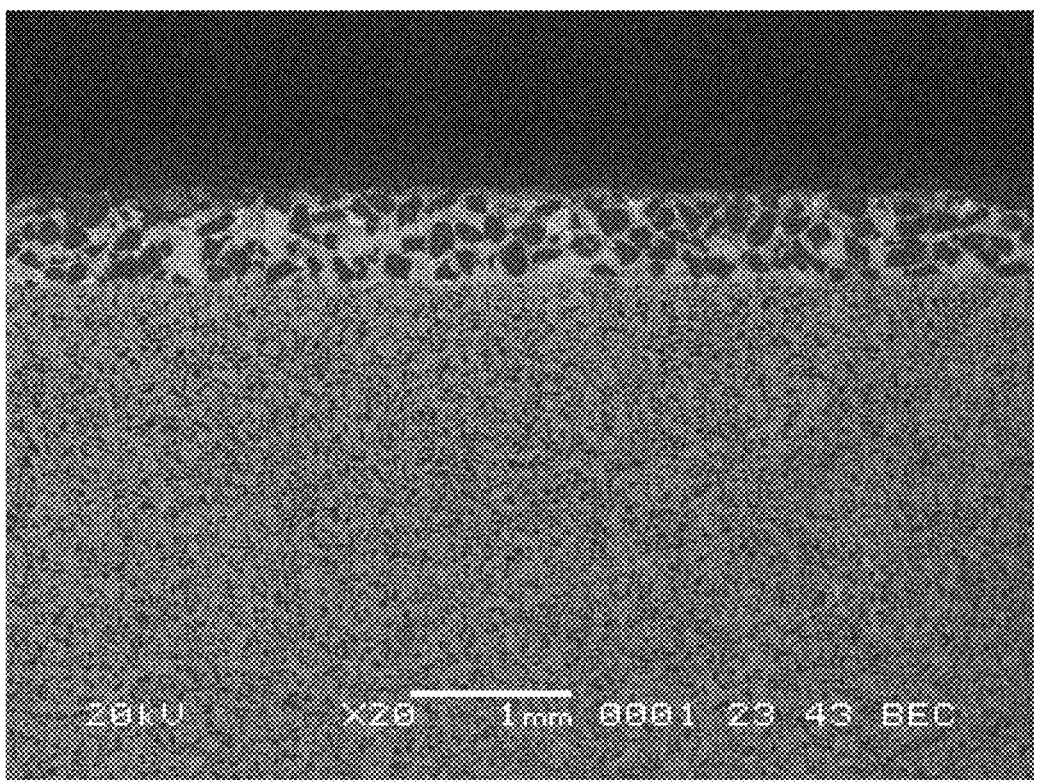
FIGS. 5A and 5B show micrograph images of the structure of the composite of FIG. 2A.
Figure 5B:
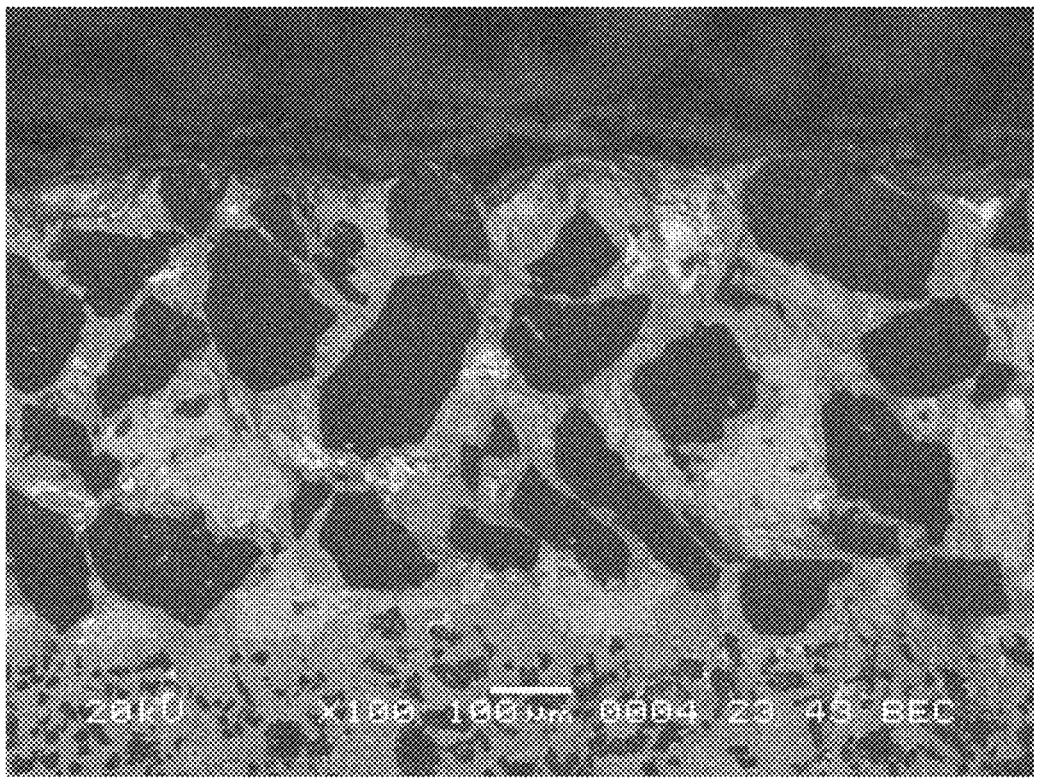

The diamond-reinforced SiC paste can be applied to the substrate, such as described herein, and formed to have a flat exposed surface. After being applied to the substrate, the silicon infiltration process can be performed to form diamond-reinforced reaction-bonded silicon carbide (e.g., DR-RB-SiC; DR-Si/SiC). Here, the diamond particles distributed through the silicon carbide reinforce the resulting material so as to be diamond reinforced DR-RB-SiC material, which is a species of RB-DSiC. Additionally, the second RB-SiC material of the RB-DiSC layer can be a DR-RB-SiC material. Further diamonds particles (e.g., larger diamond particles) may be included with the DR-RB-SiC material to form the RB-DSiC layer. The firing protocol results in the elements in the substrate reacting with the elements in the paste to form an integrated material that has the RB-SiC/DR-RB-SiC interface. FIGS. 5A and 5B include SEM micrographs of the microstructure of the RB-SiC substrate and DR-RB-SiC material as well as the interface, which clearly shows that the RB-SiC substrate is distinguishable from the DR-RB-SiC material. FIG. 5B shows a higher magnification of the RB-SiC/DR-RB-SiC interface. As can be seen, the diamond particles were bonded to a preform substrate with a SiC-based paste, following which the assembly was reactively infiltrated with molten Si to create a fully dense reaction-bonded ceramic structure with the diamond particles at the surface. As can be seen, the DR-RB-SiC material forms a layer is less than 1 mm thick; however, the thickness can be varied as needed and desired as well as within limits of practicality. An exemplary DR-RB-SiC material layer can range from about 50 µm to about 500 µm, from about 100 µm to about 400 µm, or about 200 µm to about 300 µm, where a preferred thickness can be about 250 µm.

In some embodiments, the SiC particles in the paste can range in size from about 1 µm to about 300 µm, about 2 µm to about 200 µm, or about 10 µm to about 100 µm, or about 25 µm to about 50 µm, or about 75 µm as an example, which can be dependent on diamond size.

In some embodiments, the diamond particles in the paste can range in size from about 50 µm to about 1000 µm, from about 100 µm to about 800 µm, or about 200 µm to about 600 µm, where a preferred thickness can be about 450 µm.

In some embodiments, the paste can include 0-90% by volume SiC particles and 0-90% by volume diamond particles and 10 to 100% by volume organic binder.

Silicon Carbide Spaced Diamonds

As illustrated in FIGS. 2B-2E and described in connection to FIGS. 4A-4B, the substrate can support a RB-DSiC layer having spaced apart diamond particles at or protruding from the surface. Here, the substrate is provided and then coated on its surface with the silicon carbide paste, and then the diamond particles are pressed into the surface of the silicon carbide paste. The structure is then infiltrated with molten silicon as described herein to form the substrate having the RB-DSiC layer with spaced apart diamond particles at or protruding from the surface of the second RB-SiC material. The protocol for distributing the diamond particles and pressing the diamond particles into the silicon carbide paste can determine the surface features of the resulting product. For example, sprinkling diamond particles on the surface of the silicon carbide layer before pressing can result in a random pattern or distribution of surface diamond particles. In another example, a screen can be used to screen the diamond particles into specific locations to form an ordered array pattern of diamond particles on the surface of the resulting product.

Figure 6A:
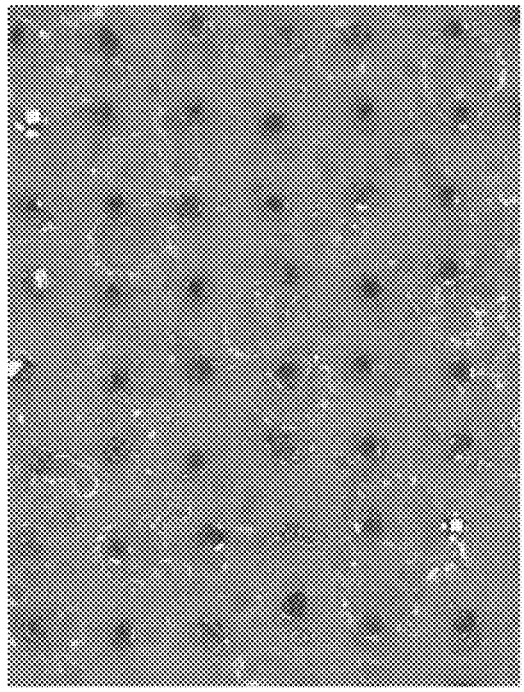
FIG. 6A shows a micrograph image of a portion of a screen where evenly and ordered spaced apart apertures are shown.

FIG. 6A shows a micrograph image of a portion of a screen where the evenly and ordered spaced apart apertures are shown. While an aligned array is shown, the columns and rows can be staggered or in any other ordered pattern. This screen is a substrate with apertures; however, other types of screens may be used. The apertures can be formed by photo-etching, machining, laser-cut, woven structure, or others.

Figure 6B:
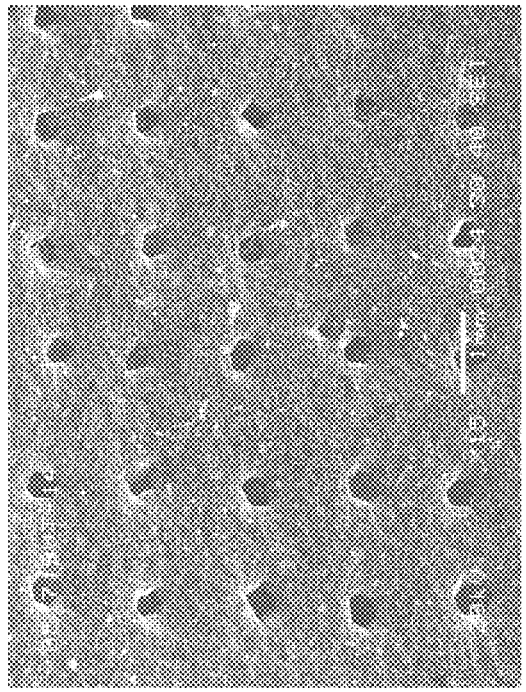
FIG. 6B shows a micrograph image of diamond particles on an adhesive sheet after being screened with the screen of FIG. 6A.

FIG. 6B shows a micrograph image of diamond particles on an adhesive sheet after being screened with the screen of FIG. 6A.

Figure 6C:
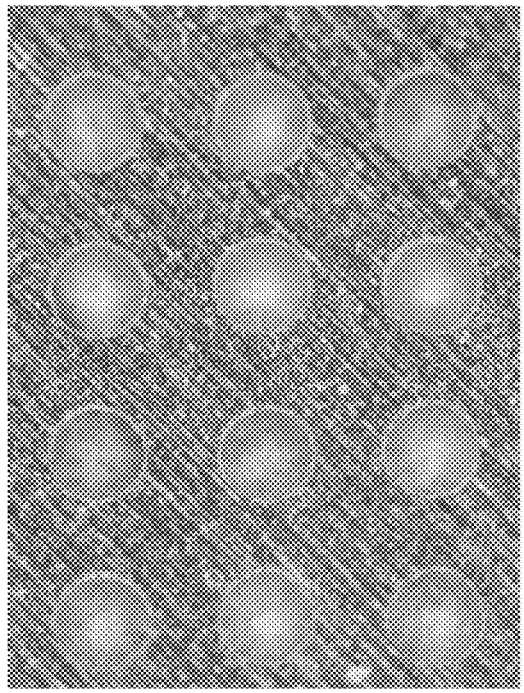
FIG. 6C shows a micrograph image of the diamond particles pressed into a SiC paste.

FIG. 6C shows a micrograph image of the diamond particles pressed into the silicon carbide paste.

Figure 6D:
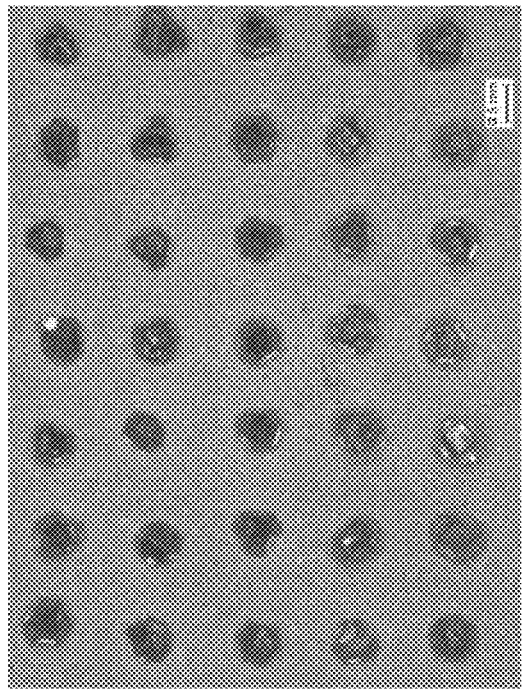
FIG. 6D shows a micrograph image of the spaced apart diamonds chemically bonded to the RB-DSiC layer.

FIG. 6D shows a micrograph image of the spaced apart diamonds chemically bonded to the second RB-SiC material to form the RB-DSiC layer.

In some embodiments, the diamond particles embedded in the surface of the silicon carbide layer can range in size from about 50 µm to about 1000 µm.

In some embodiments, the diamond particle can be spaced apart (e.g., center to center), where the spacing is often related to the size of the diamonds (e.g., average size).

Additionally, it should be recognized that the DR-RB-SiC can also include diamonds pressed into the surface, which combines the properties of the different embodiments. (e.g., FIG. 2A combined with FIGS. 2B-2E).

The diamond silicon carbide composites in accordance with the embodiments described herein can be used to improve the state of the art of CMP conditioning discs. The diamond particles are bonded to the substrate with the second RB-SiC material, whether randomly distributed throughout the second RB-SiC matrix or preferentially located at the surface of the second RB-SiC matrix. The substrate having the RB-DSiC matrix has chemical bonds between the substrate, matrix, and diamond components due to the reactive molten silicon infiltration step, thus helping to prevent diamonds from breaking free. Moreover, RB-DSiC can be chemically corrosion resistant and more wear resistant to prior CMP conditioning discs. However, these properties can also be useful in a number of articles.

The improvement in performance can be achieved because there is a strong chemical bond between the second RB-SiC matrix and the diamond particles in the RB-DSiC layer. As the molten Si infiltrates the preform assembly, a Si+C to SiC reaction occurs at the surface of the diamond (which is carbon), creating a strong SiC bond at the interface. The SiC is noble in high and low pH. Thus, the RB-DSiC layer of the conditioning disc can be suitable for basic, neutral and acidic environments (e.g., CMP slurry chemistries). The SiC is already hard and wear resistant, and the diamond particles provide for improved hardness and wear resistance. The RB-SiC/RB-DSiC conditioning disc provides long product life and a single product for multiple applications.

In some embodiments, the silicon carbide paste that is used in any of the embodiments (e.g., FIGS. 2A-2E) can be formed with fine diamond particulates. That is, the size of the diamond particulates can be much smaller than the size of the diamond particles. For example, the diamond particulates can be a percentage of the size, such as from about 1 µm to about 10 µm, from about 3 µm to about 8, or from about 4 µm to about 6 µm, or about 5 in an example. The additive of fine diamond to the RB-DSiC layer can further increase wear and corrosion resistance.

In some embodiments, the size of the diamond particles can be about the same across the surface of the RB-DSiC layer. That is, the diamonds may have a homogeneous size. Alternatively, the size of the diamond particles can vary, such as in a gradient, from one side of the surface to the other side, or in a gradient from the outer perimeter to the center. Various diamond particle size gradients can be used.

In some embodiments, the surface of the second RB-SiC material between the diamond particles can be roughened or otherwise textured. For example, various processes can be used to texturize the second RB-SiC material. In some aspects, fine diamond particulates can be layered on the surface of the silicon carbide paste before or after the larger diamond particles are pressed in the surface. Other texturizing techniques can include use of textured adhesive sheets and use of different diamond particle shapes.

In some embodiments, the RB-DSiC layer can have a layer of diamond deposited thereover. This diamond layer can provide further protection to the product. The diamond layer can be deposited by any process, such as by chemical vapor deposition (CVD). The RB-DSiC layer is well suited to CVD diamond coating due to a good coefficient of thermal expansion match between the two materials, which will provide low stress.

The specifics of desired diamond size, diamond grade, diamond spacing, or other features can be varied as known in the art. Some details are well known in the CMP conditioning disc industry to achieve a product that provides the desired cut rate and conditioning of CMP pads.

While an exemplary utility for the diamond silicon carbide composites includes CMP conditioning discs, the composite structures can be used in other industries. There are many other potential applications for diamond silicon carbide composites that have a surface layer of diamond particles. Some example of these applications include: industrial wear components; grinding wheels; honing stones; cutting tools; semiconductor pin chucks (i.e., spaced diamonds are "pins" with high wear resistance, low friction and excellent thermal properties); and thermal management devices, such as heat sink components.

In accordance with the foregoing, a composite material can include: a substrate of a first reaction-bonded silicon carbide (first RB-SiC) material; and a reaction-bonded diamond-retaining silicon carbide (RB-DSiC) layer bonded to a surface of the substrate. In some aspects, the RB-DSiC layer includes diamond particles bonded with a second reaction-bonded silicon carbide (second RB-SiC) material. In some aspects, the diamond particles are not distributed uniformly or homogeneously throughout the matrix of the second RB-SiC material. In some aspects, the diamond particles are distributed uniformly or homogeneously throughout the matrix of the second RB-SiC material. In some aspects, the diamond particles are distributed at a surface of the second RB-SiC material, and the diamond particles are at least partially embedded in a matrix of the second RB-SiC material and at least partially protruding from the surface of the second RB-SiC material. In some aspects, the diamond particles are arranged in an ordered pattern on the surface of the second RB-SiC material. In some aspects, the diamond particles are in an uno-ordered or random pattern on the surface of the second RB-SiC material. In some aspects, there are diamond particles distributed throughout the matrix of the second RB-SiC material. In some aspects, the diamond particles distributed throughout the matrix of the second RB-SiC material have a smaller average particle size compared to the diamonds distributed at the surface of the second RB-SiC material.

In some embodiments, the first RB-SiC material of the substrate is distinguishable from the second RB-SiC material of the RB-DSiC layer by at least one of: an interface between the first RB-SiC material and the second RB-SiC material; the first RB-SiC material has a first average silicon carbide (SiC) particle size that is different from a second average SiC particle size of the second RB-SiC material; the first RB-SiC material has a first average spacing distance between SiC particles that is different from a second average spacing distance of the SiC particle size of the second RB-SiC material; the first RB-SiC material has a first average volume of SiC particles per total unit volume that is different from a second average volume of SiC particles per the unit volume of the second RB-SiC material; the first RB-SiC material has a first volume percent of SiC particles that is different from a second volume percent of SiC particles of the second RB-SiC material; the first RB-SiC material has a first volume percent of SiC matrix that is different from a second volume percent of SiC matrix of the second RB-SiC material; or the first RB-SiC material has a first volume percent of unreacted silicon (Si) that is different from a second volume percent of unreacted Si of the second RB-SiC material.

In some embodiments, a CMP conditioning disc comprising the composite material described herein. However the composite material may be used in other types of devices and equipment.

In some embodiments, a method of forming a composite can include: providing a preform substrate of a first reaction-bonded silicon carbide (first RB-SiC) material; applying a silicon carbide (SiC) paste having diamond particles onto a surface of the preform substrate; infiltrating the SiC paste with molten silicon (Si) by firing the SiC paste to form a reaction-bonded diamond-retaining silicon carbide (RB-DSiC) layer bonded to the surface of the substrate, wherein the RB-DSiC layer includes diamond particles bonded with a second reaction-bonded silicon carbide (second RB-SiC) material. In some aspects, the method can include forming the SiC paste by mixing diamond particles with silicon carbide particles and an organic binder. In some aspects, the diamond particles are larger than the silicon carbide particles. In some aspects, the method can include forming the composite into a CMP conditioning disc or other type of device or equipment.

In some embodiments, a method of forming a composite can include: providing a preform substrate of a first reaction-bonded silicon carbide (first RB-SiC) material; applying a silicon carbide (SiC) paste onto a surface of the substrate; applying diamond particles onto or into a surface of the SiC paste; pressing the diamond particles into the surface of the SiC paste; infiltrating the SiC paste with molten silicon (Si) by firing the SiC paste to form molten Si infiltrated SiC paste and to form a reaction-bonded diamond-retaining silicon carbide (RB-DSiC) layer bonded to the surface of the substrate. In some aspects, the RB-DSiC layer includes diamond particles bonded with a second reaction-bonded silicon carbide (second RB-SiC) material, and the first RB-SiC material of the substrate is bonded to the second RB-SiC material of the RB-DSiC layer.

In some embodiments, the foregoing method can further include: providing an adhesive sheet; providing a screen over the adhesive sheet; screening diamond particles through the screen onto the adhesive sheet; applying the diamonds into a surface of the SiC paste while the diamonds are adhered to the adhesive sheet; and pressing the diamonds into the surface of the SiC paste while the diamonds are adhered to the adhesive sheet. In some aspects, the method can include: removing the screen prior to applying the diamond particles onto the surface of the SiC paste or pressing the diamond particles into the surface of the SiC paste; and/or removing the adhesive sheet from the diamond particles that are pressed into the SiC paste. In some aspects, the method can include at least one of: pressing the diamonds into the surface of the SiC paste to have a substantially similar length of diamond protruding from a surface of the second RB-SiC material; or pressing the diamonds into the surface of the SiC paste to have a substantially similar length of diamond embedded into a matrix of the second RB-SiC material. In some aspects, the method can include at least one of: pressing the diamonds into the surface of the SiC paste such that the diamonds protrude a substantially similar length from a surface of the SiC paste; or pressing the diamonds into the surface of the SiC paste such that the diamonds have substantially similar length of diamond embedded into the SiC paste. In some aspects, the method can include forming the SiC paste by mixing fine diamond particulates with silicon carbide particles and an organic binder. In some aspects, the method can include forming the composite into a CMP conditioning disc or other type of device or equipment.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

This application is related to U.S. Publication No. 2017/0291279 filed Apr. 6, 2017, which is incorporated herein by reference.

What is claimed is:

1. A method of forming a composite, the method comprising:
    providing a preform substrate of a reaction-bonded silicon carbide material;
    forming a silicon carbide (SiC) paste by mixing silicon carbide particles and an organic binder;
    applying the SiC paste onto a surface of the preform substrate;
    pressing diamond particles into the SiC paste after applying the SiC paste onto the surface of the preform substrate such that at least a portion of the diamond particles protrude from a surface of the SiC paste, wherein the diamond particles are larger than the silicon carbide particles, and a size of the diamond particle varies across the surface of the SiC paste;
    infiltrating the silicon carbide paste with molten silicon; and
    firing the SiC paste to carbonize the organic binder and chemically react the molten silicon with the diamond particles and the preform substrate to form a reaction-bonded diamond-retaining silicon carbide (RB-DSiC) layer reaction bonded to the surface of the preform substrate.

2. The method of claim 1, further comprising mixing fine diamond particles to the SiC paste.

3. The method of claim 2, wherein the organic binder is selected from the group consisting of polyvinyl alcohol (PVA), epoxy, phenolic, nano-carbon based slurries, and combinations thereof.

4. The method of claim 1, further comprising:
    providing an adhesive sheet;
    providing a screen over the adhesive sheet;
    screening the diamond particles through the screen onto the adhesive sheet; and
    pressing the diamond particles into the surface of the SiC paste while the diamond particles are adhered to the adhesive sheet.

5. The method of claim 4, further comprising:
    removing the screen prior to pressing the diamond particles into the surface of the SiC paste; and
    removing the adhesive sheet from the diamond particles that are pressed into the SiC paste.

6. The method of claim 1, further comprising at least one of:
    pressing the diamond particles into the surface of the SiC paste such that the diamond particles protrude a substantially same length from a surface of the SiC paste; or
    pressing the diamond particles into the surface of the SiC paste such that the diamond particles have a substantially same length of diamond embedded into the SiC paste.

7. The method of claim 1, further comprising forming the composite into a CMP conditioning disc.

8. The method of claim 1, wherein the reaction-bonded silicon carbide material or the preform substrate comprises silicon carbide (SiC) particles, the method further comprising firing the SiC paste to carbonize the organic binder and to form a reaction-bonded diamond-retaining silicon carbide (RB-DSiC) layer reaction bonded to the surface of the preform substrate comprising forming the RB-DSiC layer such that the substrate is distinguishable from the RB-DSiC layer by at least one of:
    an interface between the substrate and the RB-DSiC layer;
    the substrate has a first average SiC particle size that is different from a second average SiC particle size of the RB-DSiC layer;
    the substrate has a first average spacing distance between SiC particles that is different from a second average spacing distance between SiC particles of the RB-DSiC layer;
    the substrate has a first average volume of SiC particles per total unit volume that is different from a second average volume of SiC particles per total unit volume of the RB-DSiC layer;
    the substrate has a first volume percent of SiC particles that is different from a second volume percent of SiC particles of the RB-DSiC layer; and
    the substrate has a first volume percent of unreacted silicon (Si) that is different from a second volume percent of unreacted Si of the RB-DSiC layer.

9. The method of claim 1, further comprising mixing fine diamond particles into the SiC paste, wherein the fine diamond particles have a size of about 1 μm to about 10 μm.

10. The method of claim 1, wherein infiltrating the silicon carbide paste with the molten silicon occurs while firing the SiC paste.

\* \* \* \* \*